United States Patent
Matheson (10) Patent No.: US 11,216,780 B1
(45) Date of Patent: Jan. 4, 2022

(54) SYSTEMS AND METHODS FOR COORDINATING SUPPLY EFFORTS

(71) Applicant: United Services Automobile Association (USAA), San Antonio, TX (US)

(72) Inventor: Cory Matheson, Celina, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 1044 days.

(21) Appl. No.: 15/401,601

(22) Filed: Jan. 9, 2017

Related U.S. Application Data (60) Provisional application No. 62/278,279, filed on Jan. 13, 2016.

(51) Int. Cl.
| | |
|---|---|
| *G06Q 10/08* | (2012.01) |
| *G06Q 10/06* | (2012.01) |
| *G08G 1/00* | (2006.01) |
| *G01C 21/34* | (2006.01) |
| *G06F 16/22* | (2019.01) |

(52) U.S. Cl.
CPC ......... *G06Q 10/0875* (2013.01); *G01C 21/34* (2013.01); *G06F 16/22* (2019.01); *G06Q 10/06311* (2013.01); *G08G 1/202* (2013.01)

(58) Field of Classification Search
CPC .......... G06Q 10/0875; G06Q 10/06311; G06F 16/22; G01C 21/34; G08G 1/202
See application file for complete search history.

(56) References Cited

U.S. PATENT DOCUMENTS

| | | | | |
|---|---|---|---|---|
| 2010/0049485 A1* | 2/2010 | Lee | ......... | G06Q 10/08 703/6 |
| 2012/0123789 A1* | 5/2012 | Patel | ......... | G16H 40/20 705/2 |
| 2016/0100302 A1* | 4/2016 | Barash | ......... | G08B 21/0211 455/404.2 |
| 2017/0124853 A1* | 5/2017 | Mehta | ......... | H04M 1/72536 |

OTHER PUBLICATIONS

Wooley et al, Information Accrual for Early Detection of Disasters and Recovery Planning, 2007 (Year: 2007).*

* cited by examiner

*Primary Examiner* — Mohamed N El-Bathy
(74) *Attorney, Agent, or Firm* — Fletcher Yoder, P.C.

(57) ABSTRACT

A system may include sensors that acquire location information associated with the sensors and a processor that receives an indication that a disruptive event may occur in an area. The processor may then determine a number of individuals expected to be in the area when the disruptive event occurs based on the location information, such that the sensors are associated with one or more individuals that correspond to the number of individuals. The processor may then determine a set of supplies useful for each individual of the number of individuals, receive a list of products available at one or more organizations, apportion the list of products based on the set of supplies and the number of individuals, and send a notification to a computing device of each individual of the number of individuals indicating that the set of supplies is available.

12 Claims, 5 Drawing Sheets

SYSTEMS AND METHODS FOR COORDINATING SUPPLY EFFORTS

CROSS REFERENCE TO RELATED APPLICATION

This application claims priority to and the benefit of U.S. Provisional Application No. 62/278,279, entitled "SYSTEMS AND METHODS FOR COORDINATING SUPPLY EFFORTS," filed Jan. 13, 2016, which is hereby incorporated by reference in its entirety for all purposes.

BACKGROUND

The present disclosure relates generally to coordinating supply efforts in anticipation of or after the occurrence of a disruptive event. More specifically, the present disclosure relates to providing a system for monitoring the availability of supplies and resources and coordinating distribution efforts for a community between volunteers, organizations, and the like.

DRAWINGS

These and other features, aspects, and advantages of the present disclosure will become better understood when the following detailed description is read with reference to the accompanying drawings in which like characters represent like parts throughout the drawings, wherein.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a system may include sensors that acquire location information associated with the sensors and a processor that receives an indication that a disruptive event may occur in an area. The processor may then determine a number of individuals expected to be in the area when the disruptive event occurs based on the location information, such that the sensors are associated with one or more individuals that correspond to the number of individuals. The processor may then determine a set of supplies useful for each individual of the number of individuals, receive a list of products available at one or more organizations, apportion the list of products based on the set of supplies and the number of individuals, and send a notification to a computing device of each individual of the number of individuals indicating that the set of supplies is available.

In another embodiment, a method for building a supply database may include receiving, via a processor, a request to provide one or more products or services from an individual or an organization, receiving location information regarding a location of the individual or the organization, receiving a first set of data regarding one or more services available from the individual or the organization, receiving, via the processor, a second set of data regarding one or more supplies available from the individual or the organization, and receiving, via the processor, a periodic update regarding the first set of data and the second set of data. The method may also include storing the first set of data and the second set of data in the supply database, such that the supply database is accessible to a computing device configured to apportion the one or more services and the one or more supplies to a plurality of individuals based upon an indication of a disruptive event.

In yet another embodiment, a non-transitory computer-readable medium may include computer-executable instructions that cause a processor to receive an indication that a disruptive event has occurred in an area and identify one or more potential distribution centers, one or more available services, a plurality of volunteers, or any combination thereof based on the area, a first set of data regarding one or more organizations providing the potential distribution centers or the available services, a second set of data regarding the plurality of volunteers, or any combination thereof. The processor may also generate a supply chain delivery plan configured to schedule transportation of one or more supplies to the one or more potential distribution centers based on the first set of data and the second set of data. The processor may then send one or more notifications indicative of the supply chain delivery plan to the one or more organizations, the plurality of volunteers, or both.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

In anticipation of certain disruptive events, such as natural phenomena, social unrest, excessive demand, and the like, the general public may purchase certain supplies from various businesses and/or organizations to obtain goods in high demand, prepare to endure the disruptive event, and/or to live in the aftermath of the disruptive event. For instance, in anticipation of a hurricane, individuals may seek batteries, flashlights, candles, water, non-perishable food, and the like to prepare to live without access to fresh water, electricity, stores, and the like. During these times, the individuals may purchase more supplies than they may actually need to endure the event and the aftermath of the event. Moreover, the businesses that provide the supplies are often damaged due to the increased customer traffic through the businesses, aggressiveness asserted by customers attempting to purchase supplies, theft or looting in the aftermath of the event, and the like. In addition to tangible supplies, certain businesses or participants may also provide intangible supplies such as access to electricity, Internet, water, and the like.

With this in mind, a disruptive event management system may assist in coordinating a supply program to provide supplies to individuals that may be affected by the disruptive event, while minimizing the damage incurred by the business and the uneven distribution of supplies to individuals. As such, in accordance with present embodiments, the disruptive event management system may collect information from businesses that may desire to participate in the supply program and donate certain supplies to be provided to individuals. In addition to the businesses, individuals who may seek supplies may also subscribe or provide information to the disruptive event management system to receive notifications regarding receiving supplies.

In certain embodiments, the disruptive event management system may regularly collect information regarding the inventory of the supplies available at each of the businesses that participate in the supply program. Upon receiving a notification that a disruptive event is likely to occur in an area, the disruptive event management system may then identify supplies that may be useful to individuals that may be affected by the disruptive event. The disruptive event management system may then determine a number of individuals or households that may be affected by the disruptive event. Using the inventory information related to all of the business participants of the supply program and the expected number of affected individuals, the disruptive event may send instructions to the businesses to gather the inventory of certain supplies, package a collection of supplies together, ship the supplies to some location that may be use for packaging various supplies together, and the like. After an assortment of supplies has been assembled for each of the individuals that provided their information to the disruptive event management system, the disruptive event management system may send a notification to each individual indicating a time and location in which to retrieve their supplies.

By maintaining records regarding inventory after various times, the disruptive event management system may be equipped to coordinate supply efforts more efficiently and accurately. Moreover, by sending information to businesses and individuals, the disruptive event management system may limit the amount of data being transmitted between communication networks when bandwidth should be preserved for professionals responding to the disruptive event.

Figure 1:
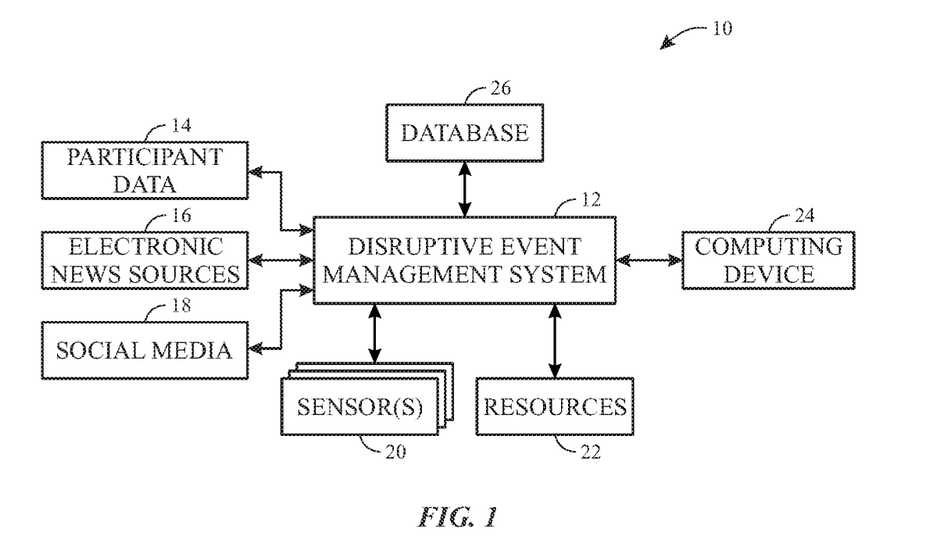
FIG. 1 illustrates a block diagram of a response system, in accordance with embodiments described herein.

By way of introduction, FIG. 1 illustrates a block diagram of a response system 10 that may include a disruptive event management system 12 that may receive data from various businesses, organizations, and/or individuals, determine how available supplies may be apportioned based on a number of individuals expected to be affected by a disruptive event and the availability of the supplies, send instructions to businesses regarding how the supplies should be packaged and a location in which they are to be shipped, and send a notification to an individual indicating that a supply package is ready for receiving at a certain location. The disruptive event management system 12 may generally be any computing device, such as a general-purpose computer, a mobile computing device, a laptop computer, a tablet computing device, a server, a cloud-computing device, and the like.

As used herein, a disruptive event may refer to any suitable type of disruptive event that is created through natural forces or human forces. As such, the disruptive event may include fires, earthquakes, tsunamis, hurricanes, tornadoes, floods, and the like. The disruptive event may also include other undesirable events.

The disruptive event management system 12 may receive information, such as participant data 14, regarding businesses that desire to participate in providing supplies for individuals in view of disruptive events. The participant data 14 regarding businesses may include information related to the location of the business, the available physical space at the business, the available parking at the business, the vehicles available to the business, a list of products available at the business, an inventory of the products available at the business, and the like.

In one embodiment, the participant data 14 associated with businesses may also include information regarding locations in which vehicles owned, operated, or associated with the businesses may be currently traveling, expected to travel (e.g., scheduled) in the future, and the like. The vehicles may be used to provide products and supplies to the businesses in the regular course of business. However, in the case of a disruptive event, the disruptive event management system 12 may use the vehicle information to coordinate the distribution of supplies to various locations. The vehicle information may be acquired by mining data sources such as emails, text messages, and the like. In some embodiments, the vehicle locations may be acquired by or directly input into the disruptive event management system 12 as a component of a mapping program that tracks vehicle routes to various destinations. In one embodiment, the disruptive event management system 12 may adjust the route of certain vehicles based on the supplies stored thereon and locations that may be in need of the supplies. In certain embodiments, the disruptive event management system 12 may be associated with a travel services organization that may assist the businesses in scheduling the itinerary for vehicle transport.

The participant data 14 may also include information regarding various governmental agencies (e.g., Federal Emergency Management Agency (FEMA)) and non-governmental agencies (e.g., non-profit organizations, religious institutions, charitable organizations). These entities may indicate that they can provide physical space to house certain individuals affected by the disruptive event. The entities may also indicate whether physical space is available for supplies to be delivered, packaged, stored, and distributed. These entities may also have access to certain supplies that may have been collected in anticipation of the disruptive events.

The participant data 14 may also include information (e.g., volunteer data) from individuals that may wish to volunteer for packaging supplies, transporting supplies, delivering supplies, distributing supplies, and the like. In certain embodiments, the volunteer data may include demographic information (e.g., a name and age) regarding the individual. The volunteer data may also include location information regarding the individual. In one embodiment, the individual may provide access to the individual's location via a wearable computing device, a mobile computing device, or the like. As such, the disruptive event management system 12 may determine the location of available volunteers and determine how volunteers should be dispersed at various supply distribution locations.

The participant data 14 may also include information regarding individuals that desire to receive supplies in the case of an occurrence of a disruptive event. As such, individuals may register to be part of the response system 10 well in advance of a disruptive event. The participant data regarding supply recipients may include the same information as mentioned above with regard to volunteers. As such, the participant data 14 may include demographic information and a location of the individual. Since the number of individuals who register for receiving supplies may likely be larger than the number of individuals that may actually be affected by the disruptive event, the disruptive event management system 12 may cross reference the locations of the potential supply recipients with an expected area in which the disruptive event may affect to identify the potential supply recipients who may be prioritized over others.

The disruptive event management system 12 may also receive data from other sources such as electronic news sources 16, social media 18, sensors 20, and other resources 22. The electronic news sources 16 may include various news services that may be updated in real time or near real time via a network (e.g., Internet). The electronic news sources 16 may provide information regarding weather alerts, natural phenomenon alerts, non-natural phenomenon alerts (e.g., traffic, active shooter), and any other information that may be published via an electronic news outlet such as a webpage, news database, or the like. As such, the disruptive event management system 12 may become aware of the likelihood of a disruptive event affecting a certain area.

The social media 18 may include data available via social media sites such as Facebook®, Twitter®, and the like. In one embodiment, the social media 18 may be associated with the individuals, businesses, organizations, governmental agencies, news outlets, and the like. For example, social media 18 associated with the location of a user or a destination of the user may be considered. The social media 18 may also include data trending on social media sites that may not be directly associated with the disruptive event. The data from the social media 18 may include information regarding a natural phenomenon or any disruptive situation.

The sensors 20 may include any type of device capable of detecting location, moisture, temperature, light, and the like. One or more sensors 20 may be disposed on different types of property such as an individual, a home, a vehicle, and the like. In certain embodiments, one or more sensors 20 may be disposed within certain rooms of the home, outside the home, within the vehicle, or outside the vehicle. The sensors 20 may also be disposed on devices carried by or worn by individuals. For example the sensors may be disposed on mobile phones, wearable electronics, and the like. In one embodiment, the sensors 20 may provide location information regarding the sensors 20. As such, the sensors 20 may provide global positioning system (GPS) coordinates and the like to indicate a location of the sensors 20.

The resources 22 may include any other electronic information that may be available via a network, the Internet, or the like. In certain embodiments, the resources 22 may include additional information regarding the individual or the organizations that registered as part of the participant data 14. For example, the resources 22 may include data such as a residential address of an individual, a business address of the individual, information related to whether the individual works at home, whether the individual is associated with a particular organization (e.g., school) or group, and other information that may provide insight regarding a location of the individual at various times during the week.

As discussed above, the disruptive event management system 12 may receive data from the various sources described above and determine whether certain individuals are at risk of being affected by a disruptive event. Upon determining that the risk is above some threshold, the disruptive event management system 12 may send a notification or alert to a computing device 24 associated with the businesses and/or organizations that registered with the disruptive event management system 12 to begin preparing supply packages. In some embodiments, depending on the type of disruptive event that is anticipated, the disruptive event management system 12 determine a list of supplies that may be useful for the individuals who may be affected by the event.

After receiving an indication that the supply packages have been prepared for the individuals, the disruptive event management system 12 may send a notification to the computing device 24 associated with the individual. In certain embodiments, the notification may cause the computing device 24 to execute an application stored on the device that may display a location in which the individual may receive his supply package. As used herein, the computing device 24 may include any computing device such as a general-purpose computer, a mobile computing device, a laptop-computing device, a tablet computing device, a wearable computing device, and the like.

Upon receiving the notification, the computing device 24 may display the notification via a text message, an email message, an alert, or the like. In any case, the notification may cause the computing device 24 to retrieve information (e.g., location of individual) that may be useful to the disruptive event management system 12 and send the information to the disruptive event management system 12. Moreover, the computing device 24 may provide a way for the individuals to effectively receive information from supply providers without clogging data communication networks or seeking information via phone calls.

After receiving the various types of information described above, the disruptive event management system 12 may store the received information in one or more databases 26. For example, the disruptive event management system 12 may store the data acquired via the sensors 20, the participant data 14, the electronic news sources 16, the social media 18, the resources 22, and the like in the databases 26. Additionally, the disruptive event management system 12 may store information regarding the determinations as to inventory levels of various supplies at different organizations, the physical space available at various locations, and the like in the databases 26.

Figure 2:
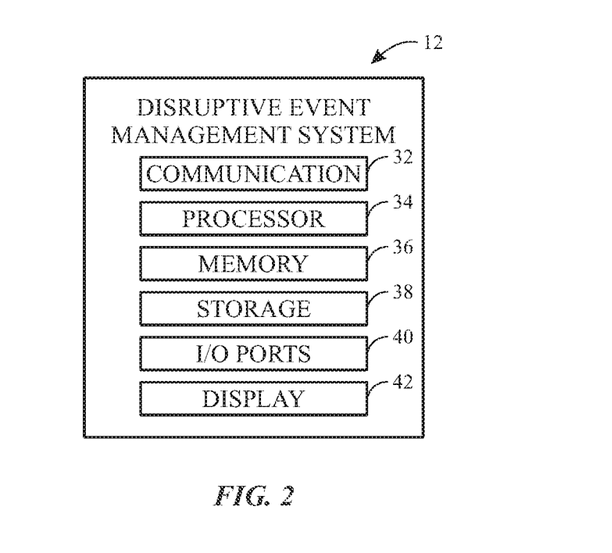
FIG. 2 illustrates a block diagram of a disruptive event system employed by the disruptive event response system of FIG. 1, in accordance with embodiments described herein.

To perform some of the actions set forth above, the disruptive event management system 12 may include certain components to facilitate these actions. FIG. 2 is a block diagram of example components within the disruptive event management system 12. For example, the disruptive event management system 12 may include a communication component 32, a processor 34, a memory 36, a storage 38, input/output (I/O) ports 40, a display 42, and the like. The communication component 32 may be a wireless or wired communication component that may facilitate communication between the disruptive event management system 12, the sensors 20, the database 26, and the computing device 24. Additionally, the communication component 32 may facilitate data transfer to the disruptive event management system 12, such that the disruptive event management system 12 may receive the participant data 14, the electronic news sources 16, the social media 18, the resources 22, and the like.

The processor 34 may be any type of suitable computer processor or microprocessor capable of executing computer-executable code. The processor 34 may also include multiple processors that may perform the operations described below.

The memory 36 and the storage 38 may be any suitable articles of manufacture that can serve as media to store processor-executable code, data, or the like. These articles of manufacture may represent computer-readable media (e.g., any suitable form of memory or storage) that may store the processor-executable code used by the processor 34 to perform the presently disclosed techniques. The memory 36 and the storage 38 may also be used to store data, various other software applications, and the like. The memory 36 and the storage 38 may represent non-transitory computer-readable media (e.g., any suitable form of memory or storage) that may store the processor-executable code used by the processor 34 to perform various techniques described herein. It should be noted that non-transitory merely indicates that the media is tangible and not a signal.

The I/O ports 40 may be interfaces that may couple to other peripheral components such as input devices (e.g., keyboard, mouse), sensors, input/output (I/O) modules, and the like. The display 42 may operate to depict visualizations associated with software or executable code being processed by the processor 34. In one embodiment, the display 42 may be a touch display capable of receiving inputs from a user of the disruptive event management system 12. The display 42 may be any suitable type of display, such as a liquid crystal display (LCD), plasma display, or an organic light emitting diode (OLED) display, for example. Additionally, in one embodiment, the display 42 may be provided in conjunction with a touch-sensitive mechanism (e.g., a touch screen) that may function as part of a control interface for the disruptive event management system 12.

It should be noted that the components described above with regard to the disruptive event management system 12 are exemplary components and the disruptive event management system 12 may include additional or fewer components as shown. Additionally, it should be noted that the computing device 24 may also include similar components as described as part of the disruptive event management system 12.

Figure 3:
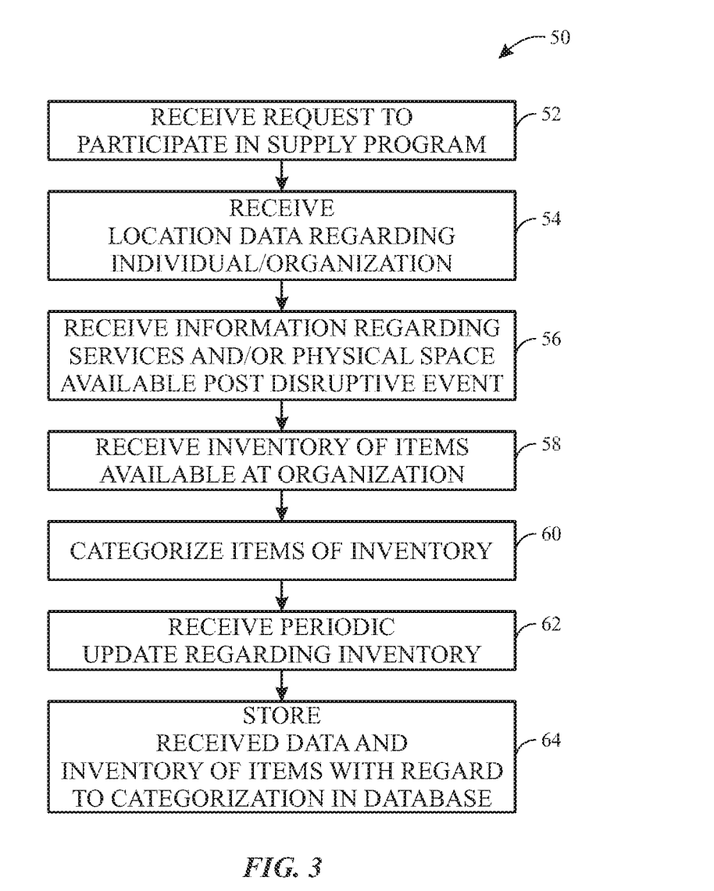
FIG. 3 illustrates a flow chart of a method for collecting and storing data related to participants of the response system of FIG. 1, in accordance with embodiments described herein.

With the foregoing in mind, FIG. 3 illustrates a flow chart of a method 50 for collecting and storing data related to participants of the response system 10, in accordance with embodiments described herein. Although the following description of the method 50 is described in a particular order, it should be noted that the method 50 may be performed in any suitable order.

Referring now to FIG. 3, at block 52, the disruptive event management system 12 may receive a request to participate in the response system 10 described above. As such, the request may be received from a business or organization that desires to provide supplies, vehicles, physical space, volunteers, and the like. The request may also be received from one or more individuals who desire to volunteer before, during, or after a disruptive event. Additionally, the request may be received from one or more individuals or households that wish to receive a supply package or notifications concerning supply efforts before, during, or after a disruptive event. As discussed above, the businesses and individuals initiating the request associated with block 52 may provide identification information (e.g., name, social security number, address), location information (e.g., vehicle GPS, wearable GPS, mobile device GPS), and other types of information described above as the participant data 14.

At block 54, the disruptive event management system 12 may receive location data regarding the individual, business, or organization attempting to participate in the supply program. In certain embodiments, the request to participate in the response system 10 may be received via a software application executed on the computing device 24 (e.g., mobile computing device). In this case, the computing device 24 may retrieve the location of the requester using location sensors (e.g., wireless network location detector, GPS sensors) disposed on the computing device 24 and send the location data to the disruptive event management system 12.

At block 56, the disruptive event management system 12 may receive information regarding services and/or physical space that the business or organization may have available to provide for the supply efforts. For instance, a business may indicate that it has available warehouse space that may be used as a hub or location in which supplies may be received from various suppliers, packaged for individuals, and distributed or apportioned to those individuals that registered to the response system 10.

Generally, since a number of businesses and organizations may register to assist in supply efforts, the disruptive event management system 12 may serve as a single data collection point to identify the resources that are currently available and may be apportioned to the individuals affected by the event. As such, at block 58, the disruptive event management system 12 may receive an inventory of the items or products that may be available at the business or organization. The inventory may include items that may be limited in supply due to the impending disruptive event such as water, batteries, candles, non-perishable food items, plywood, generators, and the like.

At block 60, the disruptive event management system 12 may categorize the items of the inventory into various categories such as food supplies, energy supplies, shelter supplies, and the like. In certain embodiments, the disruptive event management system 12 may categorize the supplies with regard to various types of disruptive events.

After receiving information regarding the inventory of items available at each business or organization, at block 62, the disruptive event management system 12 may periodically receive an update regarding the inventory of each subscribed business or organization. In one embodiment, each item may be associated with an electronic tag (e.g., RFID, SKU) and the computing device 24 may maintain a real-time count of the items available at the business. The computing device 24 may then periodically send the disruptive event management system 12 an updated count of each of the items available at the respective business or organization.

At block 64, the disruptive event management system 12 may store the information received via the method 50 in a storage, memory, the database 26, or the like. By storing the information received via the method 50, including the categorizations determined at block 60, the disruptive event management system 12 may better identify what supplies are available, how the supplies may be efficiently packaged together in view of available physical space and the location of volunteers, and ultimately provide the supply packages to those individuals who are in need of the supplies.

Figure 4:
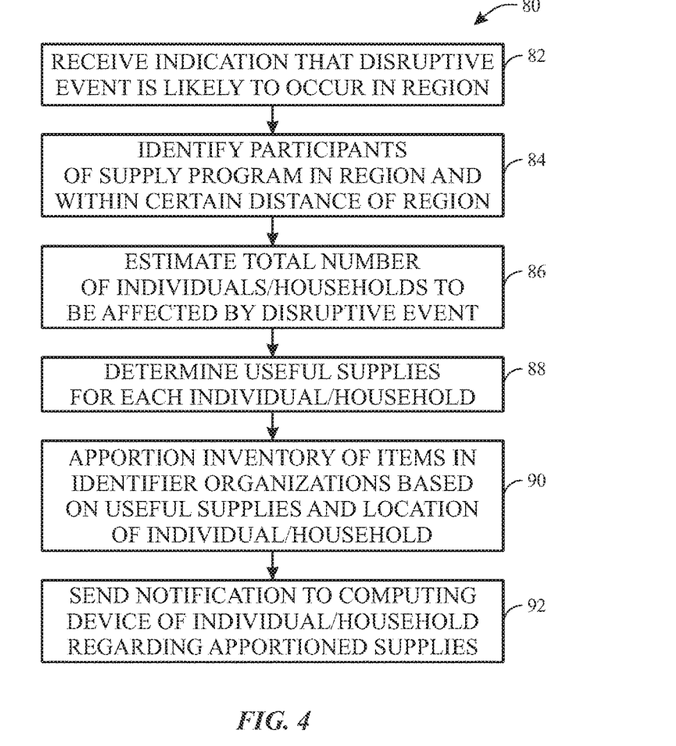
FIG. 4 illustrates a flow chart of a method for notifying individuals of the availability of supplies as determined by the disruptive event management system of FIG. 2, in accordance with embodiments described herein.

With this in mind, FIG. 4 illustrates a flow chart of a method 80 for notifying individuals of the availability of supplies as determined by the disruptive event management system 12, in accordance with embodiments described herein. Like the method 50 described above, although the method 80 is described in a particular order, it should be noted that the method 80 may be performed in any suitable order.

Referring now to FIG. 4, at block 82, the disruptive event management system 12 may receive an indication that a disruptive event is likely to occur in an area. The disruptive event management system 12 may receive this indication via the electronic news sources 16, social media 18, resources 22, or the like.

In any case, upon receiving the indication of the likely event, at block 84, the disruptive event management system 12 may identify the participants of the response system 10 that may be located within a certain distance of an area that may experience the effects of the disruptive event. As such, the disruptive event management system 12 may cross reference the location data associated with the businesses, organizations, volunteers, and potential supply recipients with the areas expected to be affected by the disruptive event.

At block 86, the disruptive event management system 12 may estimate a total number of individuals or households that may be affected by the disruptive event based on the location data of the individuals in the area and the area that the disruptive event is projected to travel.

At block 88, the disruptive event management system 12 may identify a number of supply items or products that may be useful for individuals based on the area that the disruptive event is expected to affect, the type of disruptive event that is occurring, and the like. In one embodiment, the disruptive event management system 12 may identify the useful supplies based on sales or demand data associated with other similar types of disruptive events that occurred in the past.

At block 90, the disruptive event management system 12 may apportion the available items identified as supply items and provided by the businesses and organizations for each individual requesting the supplies and who is located in an area that is expected to be affected by the disruptive event. In this manner, the disruptive event management system 12 may prioritize supply packages for individuals most likely to need the supplies.

At block 92, the disruptive event management system 12 may send a notification to the individuals that have been identified as likely to be affected by the disruptive event. The notification may indicate that a supply package is ready to be received by the individual at a particular location. The determination of the locations for distribution of the supply packages will be described in more detail with reference to FIG. 5 below.

Figure 5:
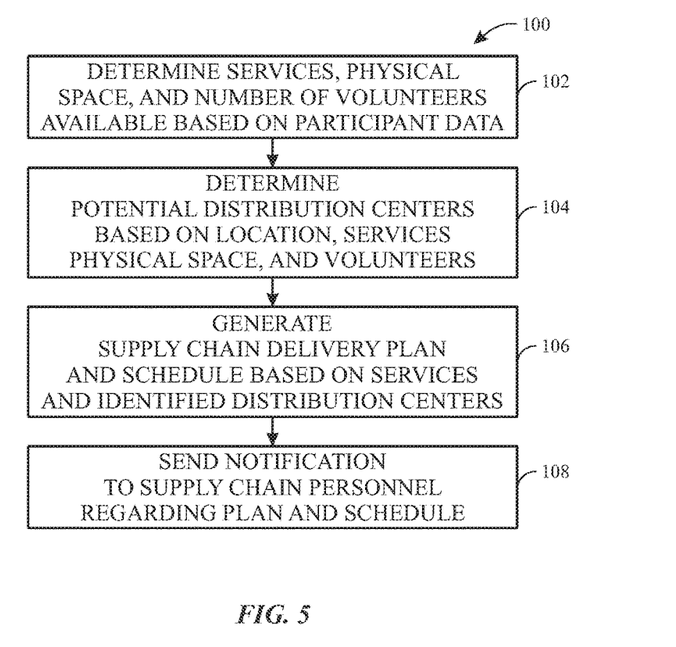
FIG. 5 illustrates a flow chart of a method for notifying supply chain personnel of supply routes and schedules as determined by the disruptive event management system of FIG. 2, in accordance with embodiments described herein.

FIG. 5 illustrates a flow chart of a method 100 for notifying supply chain personnel of supply routes and schedules as determined by the disruptive event management system 12, in accordance with embodiments described herein. Like the methods 50 and 80, the method 100 may be performed in any suitable order.

Generally, when accounting for supplies available at various businesses and organizations, the disruptive event management system 12 may account for the locations of the supplies at the various businesses and organizations. That is, with the number of different participants, the supplies will likely be located at various locations dispersed throughout a region. To provide an efficient way to disperse a packaged set of supplies, it may be useful to identify a location that may be best suited for receiving supplies, assembling packages for the supplies, and distributing the packages. As such, the disruptive event management system 12 may coordinate the shipping of certain supplies from various businesses and/or organizations to the identified locations.

With this in mind and referring to FIG. 5, at block 102, the disruptive event management system 12 may determine services (e.g., supply routes, vehicles, personnel), physical space, and a number of volunteers available for an area expected to be affected by the disruptive event. The disruptive event management system 12 may retrieve this information based on the participant data 14 provided by each respective participant. In one embodiment, the disruptive event management system 12 may send a verification request to the computing device 24 associated with each participant to verify that the participant is still capable of providing the services, physical space, and other details it previously indicated as being available in anticipation of an disruptive event.

At block 104, the disruptive event management system 12 may identify potential distribution centers for distributing the supply packages based on the location of the potential center in view of the area to be affected by the disruptive event, the services available to the disruptive event management system 12, the locations of the individuals likely to seek the supply packages, the physical space available at the potential center, the locations of the potential volunteers, and the like. For instance, the disruptive event management system 12 may identify a participating business that has a large warehouse located outside the disruptive event expected area and within a certain distance of a certain percentage of the individuals that may be seeking supply packages. Moreover, when identifying the potential distribution center, the disruptive event management system 12 may account for the vehicles that may be available to the disruptive event management system 12 (e.g., the vehicles indicated as associated with the participant businesses and organizations) to determine whether the vehicles will be able to transfer various supplies to the potential distribution center prior the expected arrival of the disruptive event.

At block 106, after identifying the potential distribution center, the disruptive event management system 12 may generate a supply chain delivery plan and schedule to transport the identified supplies of block 88 of the method 80 from the various participating businesses and organizations to the identified distribution center. That is, the disruptive event management system 12 may use the vehicles provided by all of the participating businesses and organizations to transport the identified supplies from the participating businesses to the identified distribution center. In one embodiment, the disruptive event management system 12 may identify supply vehicles having the identified supplies that may be en route to certain locations and divert the destinations of the vehicles to the identified distribution center by sending updated GPS coordinates to a navigation system, an electronic message to a computing device 24 associated with the vehicle, and the like.

Upon determining the supply chain delivery plan and schedule, the disruptive event management system 12 may send a notification to the computing device 24 associated with the supply chain personnel or the participating businesses regarding the generated plan and schedule. In certain embodiments, the notification may cause the computing device 24 to execute a software application and adjust a current supply chain plan and schedule for the participating businesses.

Figure 6:
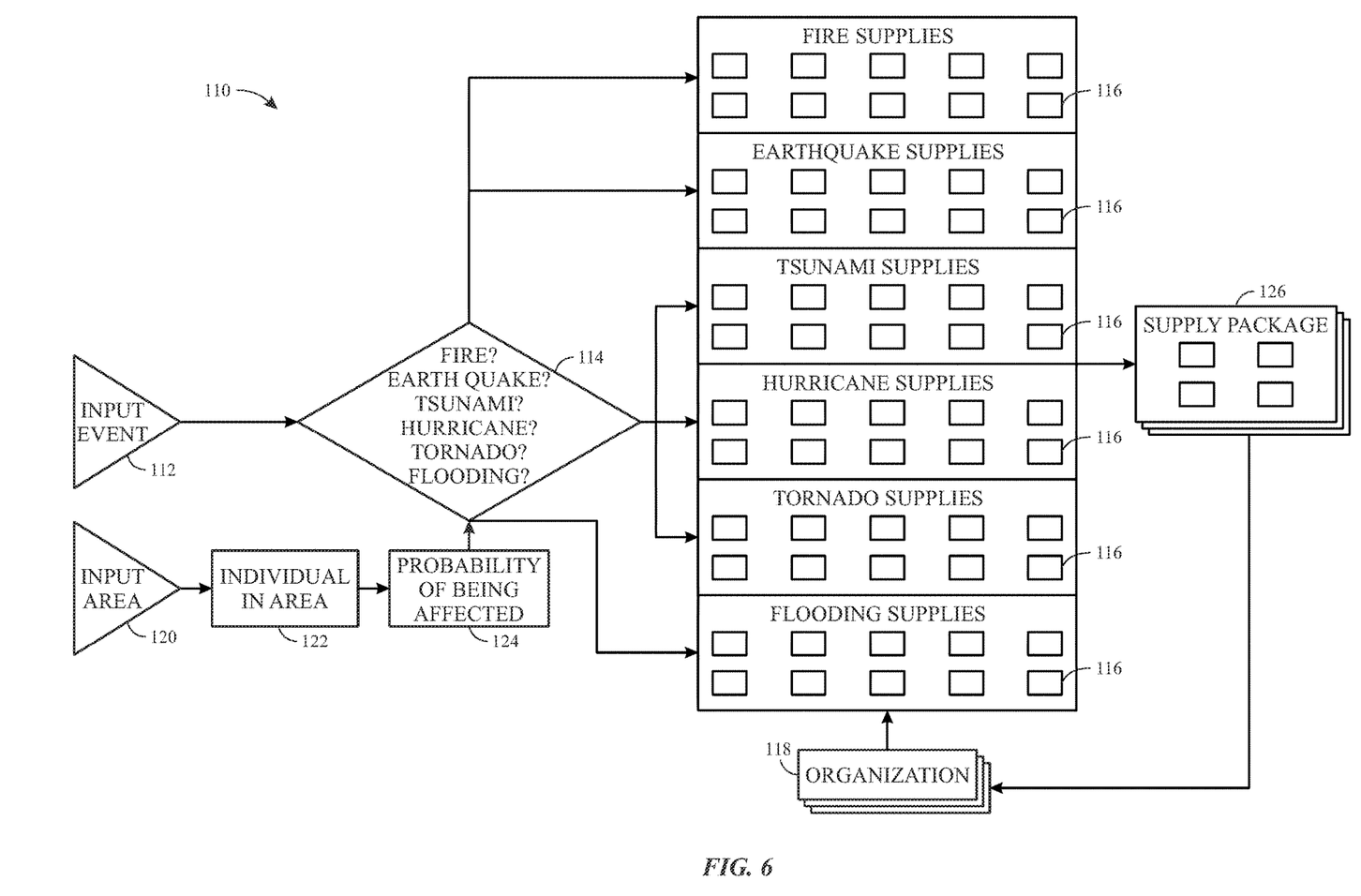
FIG. 6 illustrates block diagram of an example algorithm that may be employed by the disruptive event management system of FIG. 2 to determine a supply package for an individual, in accordance with embodiments described herein.

With the foregoing in mind, FIG. 6 illustrates block diagram of an example algorithm 110 that may be employed by the disruptive event management system 12 to determine a supply package for an individual, in accordance with embodiments described herein. As shown in the algorithm 110, an input event 112 may be provided to an event categorizer 114. The input event 112 may be an indication or notification that a disruptive event may be likely to occur. The categorizer 114 may receive the input event 112 and categorize the disruptive event into one or more types of disruptive event categories, such as fire, earthquakes, hurricanes, tornadoes, flooding, and the like.

The algorithm 110 may also receive information regarding various supplies 116 provided from various organizations 118 participating in the response system 10. Using the supplies 116 and the various categorizations described above, the algorithm 110 may categorize the supplies 116 according to each type of disruptive event. As such, the algorithm 110 may maintain a current inventory of supplies available to the disruptive event management system 12.

In addition to the input event 112, the algorithm 110 may also receive an input area 120. The input area 120 may indicate an expected area in which the disruptive event is likely to occur. Using the input area 120, the algorithm 110 may determine a number of individuals 122 in the area and a probability 124 that the individuals 122 will be affected by the disruptive event. The algorithm 110 may use the individuals 122, the probability 124, and the supplies 116 available to then determine a number of supply packages 126 that the disruptive event management system 12 may be able to provide. The supply packages 126 may then be delivered to a distribution center identified as one of the organizations 118 for distribution.

Figure 7:
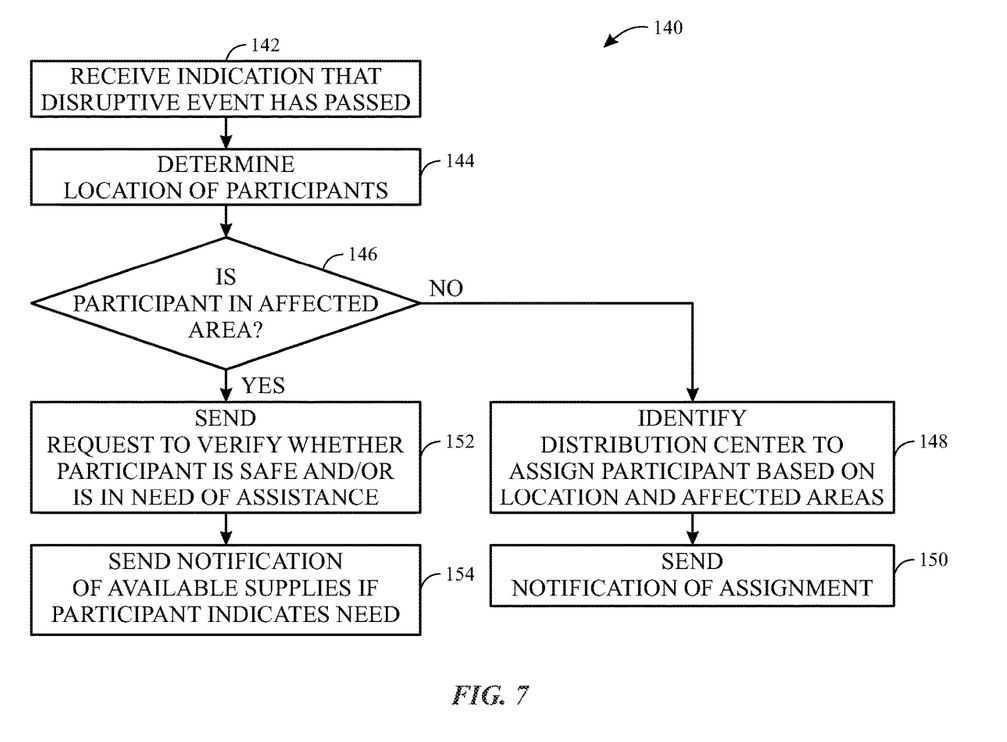
FIG. 7 illustrates a flow chart of a method for notifying participants of the response system of their respective assignments as determined by the disruptive event management system of FIG. 2, in accordance with embodiments described herein.

The disruptive event management system 12 may also coordinate the distribution of volunteers to the identified distribution center to assist in preparing the supply package and distributing the supply packages. FIG. 7 illustrates a flow chart of a method 140 for notifying participants of the response system 10 of their respective assignments as determined by the disruptive event management system 12, in accordance with embodiments described herein. Again, like the methods described above, the method 140 may be performed in any suitable order.

At block 142, the disruptive event management system 12 may receive an indication that the disruptive event has passed via the electronic news sources 16, social media 18, resources 22, and the like. At block 144, the disruptive event management system 12 may determine the locations of the volunteer participants according to the participant data 14, the sensors 20, or the like.

Based in the location of the volunteer participant, the disruptive event management system 12 may, at block 146, determine whether each participant is in an area that has been affected by the disruptive event. If the volunteer participant is not located in the affected area, the disruptive event management system 12 may proceed to block 148 and identify a distribution center to assign the volunteer participant based on the location of the volunteer and the location of the distribution center. When identifying a distribution center to assign the volunteer, the disruptive event management system 12 may also consider the location of the areas affected by the disruptive event. That is, if certain areas are expected to have more individuals seeking supply packages due to the damage caused by the disruptive event, the disruptive event management system 12 may select a distribution center that may be in need of a disproportionate amount of volunteer as compared to other distribution centers. In one embodiment, the disruptive event management system 12 may assign the volunteer participant to a distribution center that is located within a certain distance of the location of the volunteer. If the identified distribution centers are all located more than the specified distance from the location of the volunteer, the disruptive event management system 12 may not send an assignment.

After identifying the distribution center at block 148, the disruptive event management system 12 may send a notification of the volunteer's assignment to the computing device 24 associated with the volunteer. As such, upon receiving the notification, the computing device 24 may automatically execute a software application stored on the computing device 24 that may provide additional details regarding the assignment. The software application may, in certain embodiments, provide navigation services to assist the volunteer in reaching the distribution center. The software application may also provide traffic news and relevant news related to the status of the disruptive event. By coordinating the flow of information to the volunteer participants, the disruptive event management system 12 may effectively limit the amount of data being transmitted over various communication networks, thereby keeping network bandwidth available for professionals, governmental agencies, and other disruptive event responders.

Referring back to block 146, if the disruptive event management system 12 determines that the participant is located in the affected area, the disruptive event management system 12 may proceed to block 152. At block 152, the disruptive event management system 12 may send a request to the computing device 24 of the volunteer to verify whether the volunteer participant is safe and/or in need of assistance. If the volunteer indicates that he is in need of assistance, the disruptive event management system 12 may determine whether the volunteer has registered with the response system 10 as an individual seeking supplies. If the volunteer has indeed listed himself as a supply recipient, the disruptive event management system 12 may, at block 154, send the computing device 24 a notification when a supply package is available for the volunteer to receive, as described above.

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The invention claimed is:
1. A system, comprising:
 a plurality of position sensors configured to acquire location information associated with the plurality of position sensors that corresponds to a plurality of individuals associated with an area; and a processor configured to:
receive the location information from the plurality of position sensors;
receive an indication that a disruptive event may occur in the area, wherein the disruptive event corresponds to a weather event expected to affect the area within an amount of time;
determine a number of individuals expected to be in a threshold distance from the area based on the location information and in response to receiving the indication, wherein the number of individuals corresponds to at least a portion of the plurality of individuals;
determine a set of supplies for each individual of the number of individuals based on a type of the disruptive event and previous demand data associated with the type of the disruptive event;
receive a list of products available at one or more organizations;
apportion the list of products based on the set of supplies and the number of individuals; and
for a first individual of the at least the portion of the plurality of individuals:
send, to a computing device associated with the first individual, a request to verify that the first individual is in need of the set of supplies;
receive, from the computing device, a response indicating that the first individual is in need of the set of supplies, wherein the computing device is configured to:
retrieve from a position sensor associated with the computing device a current location associated with the first individual in response to sending the response indicating that the first individual is in need of the set of supplies;
identify a location of a distribution center within a proximity of the first individual based on the current location associated with the first individual; and
send, to the computing device, a notification indicating that the set of supplies is available for the first individual at the distribution center, wherein the notification is configured to cause a software application stored in the computing device to automatically provide a navigation service for directing the first individual to the distribution center based on an updated current location associated with the computing device acquired by the position sensor and the location of the distribution center.

2. The system of claim 1, wherein the indication that the disruptive event may occur is acquired via an electronic news source, a social media site, or any combination thereof.

3. The system of claim 1, wherein the processor is configured to:
identify one of the one or more organizations as the distribution center based on a location of the one of the one or more organizations, the area, the location information, or any combination thereof; and
send an additional notification to a respective computing device of each individual of the number of individuals, wherein the additional notification comprises an address of the one of the one or more organizations.

4. The system of claim 1, wherein the processor is configured to receive a list of products available at the one or more organizations periodically before receiving the indication.

5. The system of claim 1, wherein at least one of the plurality of position sensors are configured to be worn by at least one of the number of individuals.

6. The system of claim 1, wherein the disruptive event comprises a hurricane, a tsunami, flooding, a tornado, or any combination thereof.

7. A non-transitory computer-readable medium comprising computer-executable instructions configured to cause a processor to:
receive an indication that a disruptive event may occur in an area, wherein the disruptive event corresponds to a weather event expected to affect the area within an amount of time;
determine a number of individuals expected to be in the area based on location information from a plurality of position sensors associated with the number of individuals;
determine a set of supplies for each individual of the number of individuals based on a type of the disruptive event and previous demand data associated with the type of the disruptive event;
identify one or more potential distribution centers, one or more available services, a plurality of volunteers, or any combination thereof based on the area, a first set of data regarding one or more organizations providing the potential distribution centers or the available services, a second set of data regarding the plurality of volunteers, or any combination thereof;
generate a supply chain delivery plan configured to schedule transportation of one or more supplies to the one or more potential distribution centers based on the first set of data and the second set of data;
send one or more notifications indicative of the supply chain delivery plan to the one or more organizations;
determine an additional number of locations of the number of individuals based on location information acquired from one or more position sensors associated with the number of individuals;
for a first individual of the number of individuals, determine whether the first individual is within a threshold distance of the area based on a first location of the location information;
in response to the first individual being located within the threshold distance of the area:
send, to a computing device associated with the first individual, a request to verify that the first individual requests assistance, wherein the assistance comprises the set of supplies;
receive, from the computing device, a response indicating that the first individual is requesting the assistance, wherein the computing device is configured to retrieve a current location associated with the first individual;
in response to sending the response indicating that the first individual is requesting the assistance:
identify a location of a distribution center within a proximity of the first individual based on the current location associated with the first individual; and
send, to the computing device, a notification indicating that the set of supplies is available for the first individual at the distribution center, wherein the notification is configured to cause a software application to automatically provide a navigation service for directing the first individual to the distribution center based on an updated current location retrieved from the one or more position sensors and the location of the distribution center;

identify a first volunteer of the plurality of volunteers to assign to the distribution center based on an additional current location of the first volunteer and the location of the distribution center; and send, to an additional computing device associated with the first volunteer, an additional notification of an assignment to the distribution center, wherein the additional notification of the assignment is configured to cause an additional software application of the additional computing device to automatically provide an additional navigation service for directing the first volunteer to the distribution center based on an updated additional current location of the first volunteer and the location of the distribution center.

8. The non-transitory computer-readable medium of claim 7, wherein the processor is configured to generate the supply chain delivery plan based on one or more locations of one or more vehicles associated with the one or more organizations.

9. The non-transitory computer-readable medium of claim 8, wherein the processor is configured to send Global Positioning System (GPS) data to a navigation system associated with at least one of the one or more vehicles based on the one or more locations.

10. The non-transitory computer-readable medium of claim 7, wherein the one or more supplies comprise water, one or more batteries, one or more candles, one or more food items, plywood, one or more generators, or any combination thereof.

11. The non-transitory computer-readable medium of claim 7, wherein the indication that the disruptive event may occur is acquired via an electronic news source, a social media site, or any combination thereof.

12. The transitory computer-readable medium of claim 7, wherein the disruptive event comprises a fire, an earthquake, a hurricane, a tsunami, flooding, a tornado, or any combination thereof.

* * * * *

UNITED STATES PATENT AND TRADEMARK OFFICE
CERTIFICATE OF CORRECTION

PATENT NO. : 11,216,780 B1
APPLICATION NO. : 15/401601
DATED : January 4, 2022
INVENTOR(S) : Cory Matheson It is certified that error appears in the above-identified patent and that said Letters Patent is hereby corrected as shown below:

In the Specification

1. In Column 1, Line 24, delete "DRAWINGS" and insert -- BRIEF DESCRIPTION OF THE DRAWINGS --, therefor.

2. In Column 1, Line 48, delete "block" and insert -- a block --, therefor.

3. In Column 3, Line 32, delete "Internet," and insert -- internet, --, therefor.

4. In Column 3, Line 61, delete "use" and insert -- used --, therefor.

5. In Column 10, Lines 32-33, delete "an disruptive" and insert -- a disruptive --, therefor.

6. In Column 11, Line 14, delete "block" and insert -- a block --, therefor.

7. In Column 11, Line 64, delete "in" and insert -- on --, therefor.

In the Claims

8. In Column 13, Lines 57-58, in Claim 3, delete "of the one of the one" and insert -- of the one --, therefor.

9. In Column 13, Line 63, in Claim 3, delete "of the one of the one" and insert -- of the one --, therefor.

10. In Column 14, Line 5, in Claim 6, delete "flooding," and insert -- a flooding, --, therefor.

11. In Column 16, Line 17, in Claim 12, delete "transitory" and insert -- non-transitory --, therefor.

Signed and Sealed this
Eighth Day of March, 2022

Drew Hirshfeld
*Performing the Functions and Duties of the
Under Secretary of Commerce for Intellectual Property and
Director of the United States Patent and Trademark Office*

12. In Column 16, Line 18, in Claim 12, delete "comprises a fire, an earthquake," and insert -- comprises --, therefor.

13. In Column 16, Line 19, in Claim 12, delete "flooding," and insert -- a flooding, --, therefor.